United States Patent [19]

Herpers et al.

[11] 4,377,017
[45] Mar. 22, 1983

[54] SCRUBBING MACHINE WITH WATER REGENERATION

[75] Inventors: Ferdinand J. Herpers, Minnetonka; Harley E. Kroll, Chaska; Alfred D. Carlson, Minneapolis; Paul D. Dodge, Apple Valley, all of Minn.

[73] Assignee: Tennant Company, Minneapolis, Minn.

[21] Appl. No.: 95,466

[22] Filed: Nov. 19, 1979

Related U.S. Application Data

[62] Division of Ser. No. 916,929, Jun. 19, 1978, Pat. No. 4,199,263.

[51] Int. Cl.³ .............................................. A47L 11/30
[52] U.S. Cl. ...................................... 15/320; 15/353; 210/320; 210/522
[58] Field of Search ................. 15/320, 352, 353, 340; 210/320, 522

[56] References Cited

U.S. PATENT DOCUMENTS

| 2,383,302 | 8/1945 | Feinauer et al. | 210/320 X |
| 2,635,277 | 4/1953 | Belknap | 15/353 X |
| 2,635,278 | 4/1953 | Belknap | 15/353 |
| 3,753,777 | 8/1973 | Thomsen et al. | 15/320 X |
| 3,996,640 | 12/1976 | Blue et al. | 15/320 |

FOREIGN PATENT DOCUMENTS 6501029 8/1965 Netherlands ..................... 210/320

*Primary Examiner*—Chris K. Moore
*Attorney, Agent, or Firm*—Merchant, Gould, Smith, Edell, Welter & Schmidt

[57] ABSTRACT

A scrubber is disclosed including an applicator for applying a cleaning solution, a rotary brush for working such solution on the soiled surface and a pick up section for removing the cleaning solution and suspended soilage from the surface being scrubbed. The scrubber includes a dirty solution chamber and a clean solution chamber. A separator is provided between such chambers to separate the dirty water into a sludge portion which is returned to the dirty water chamber and a clean solution portion which is fed into the second chamber.

5 Claims, 14 Drawing Figures

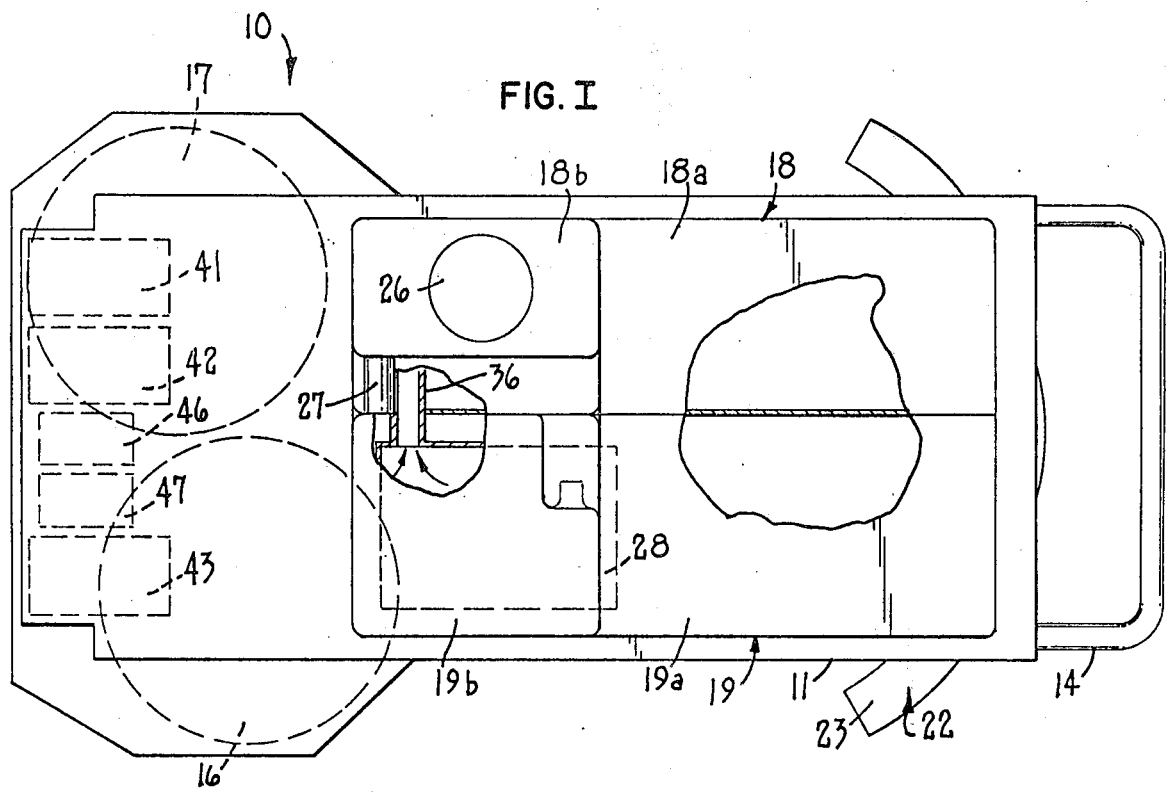
FIG. I
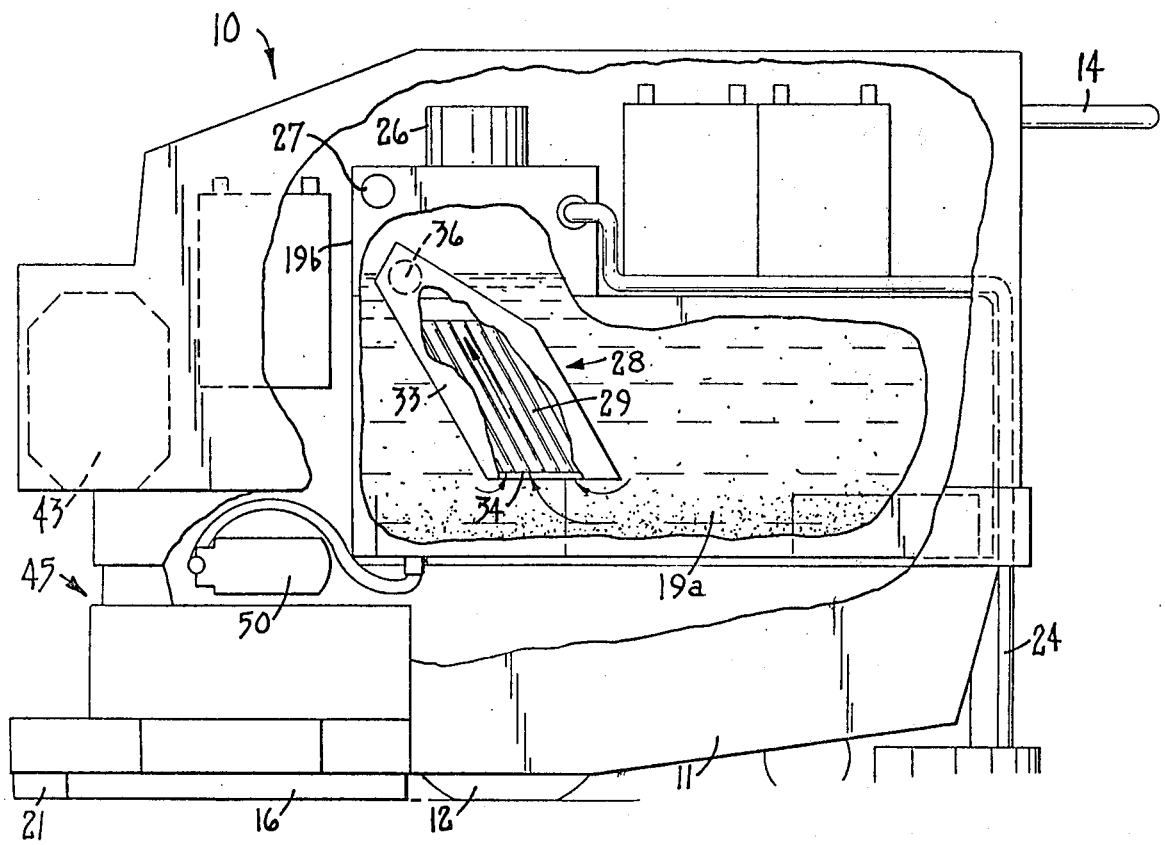
FIG. II

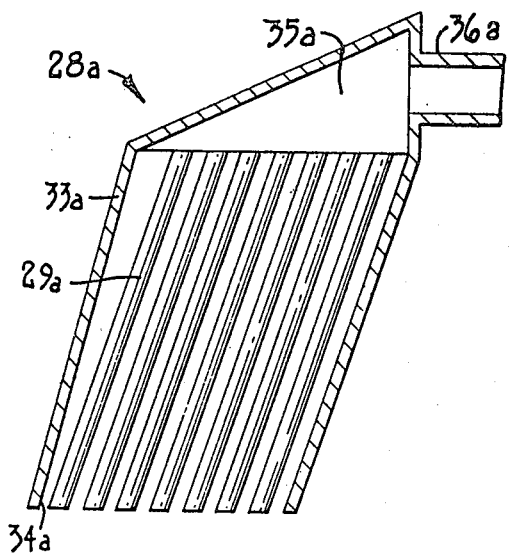
FIG. IIIa
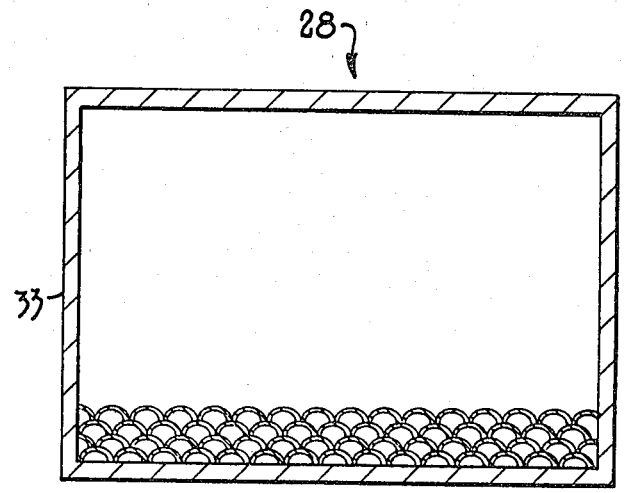
FIG. III
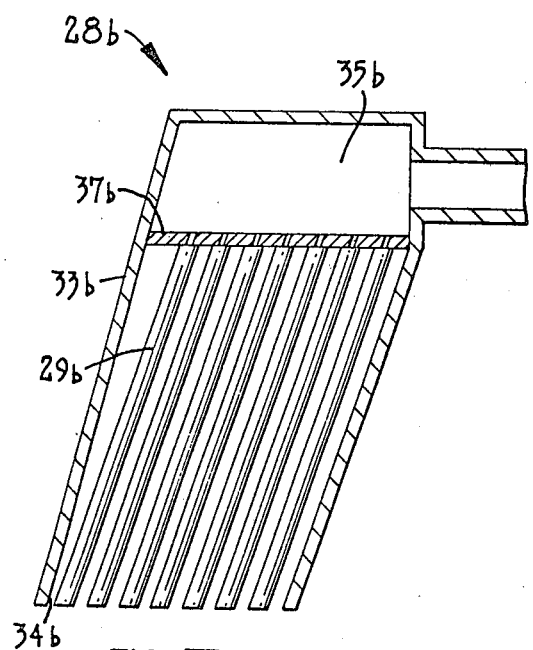
FIG. IIIb
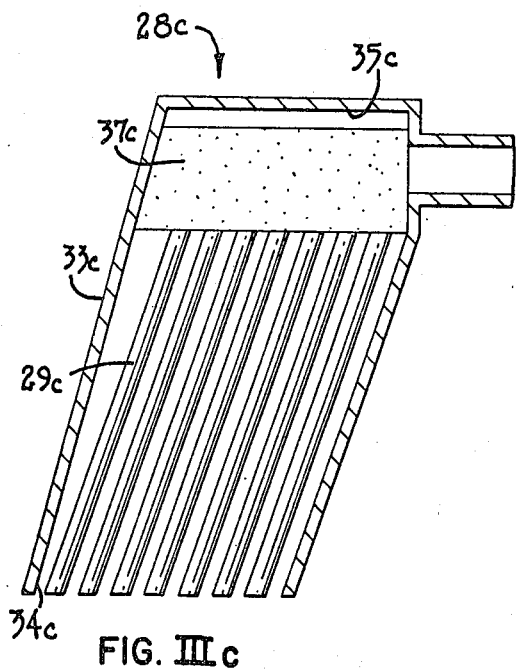
FIG. IIIc

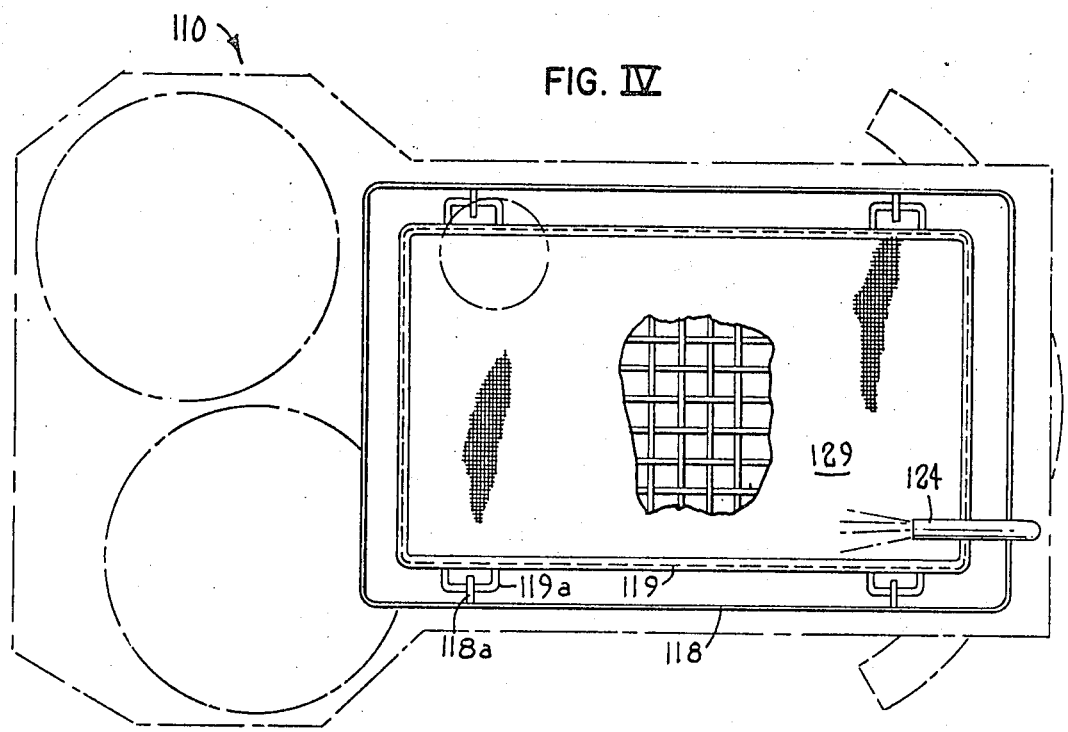
FIG. IV
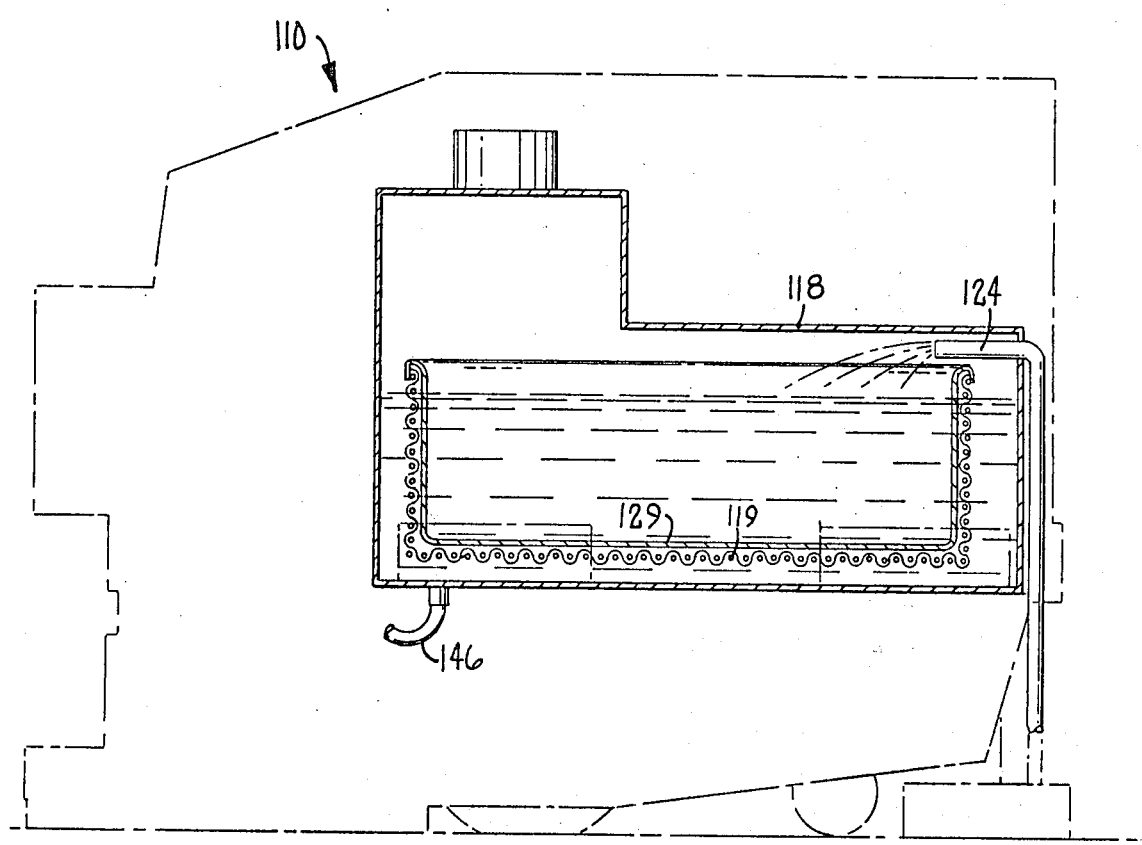
FIG. V

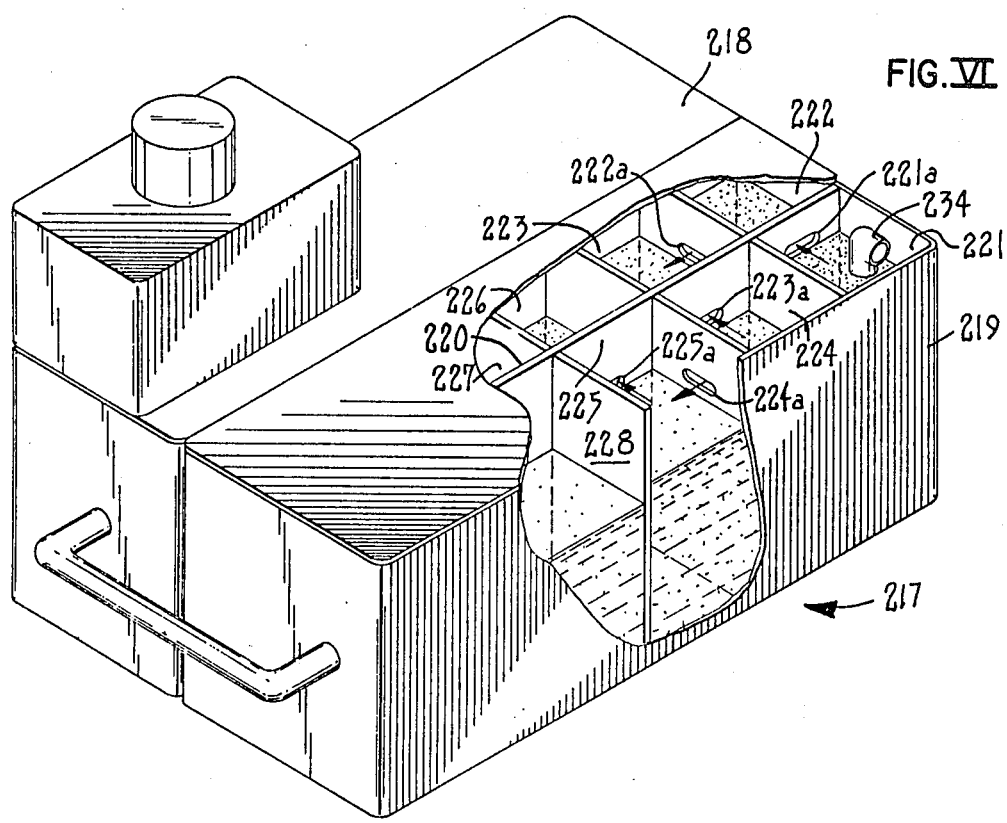
FIG. VI
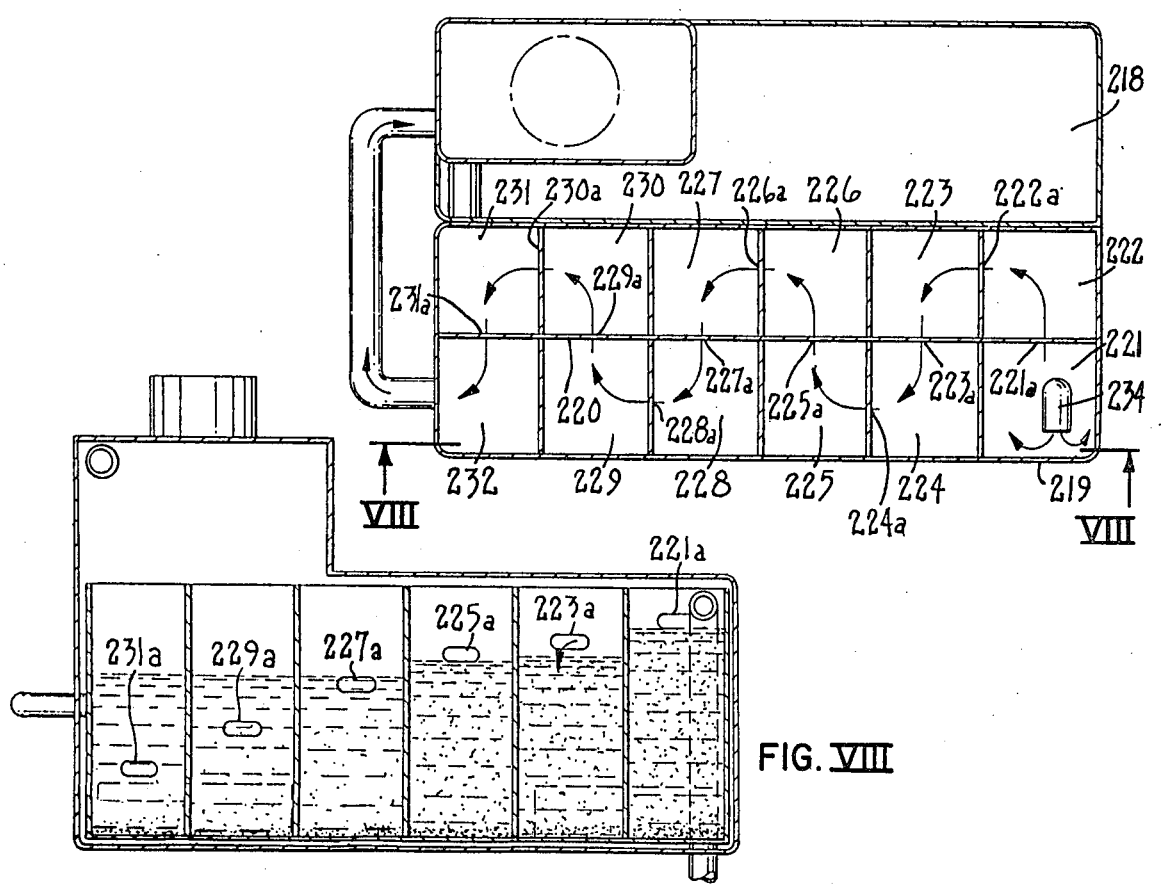
FIG. VII
FIG. VIII

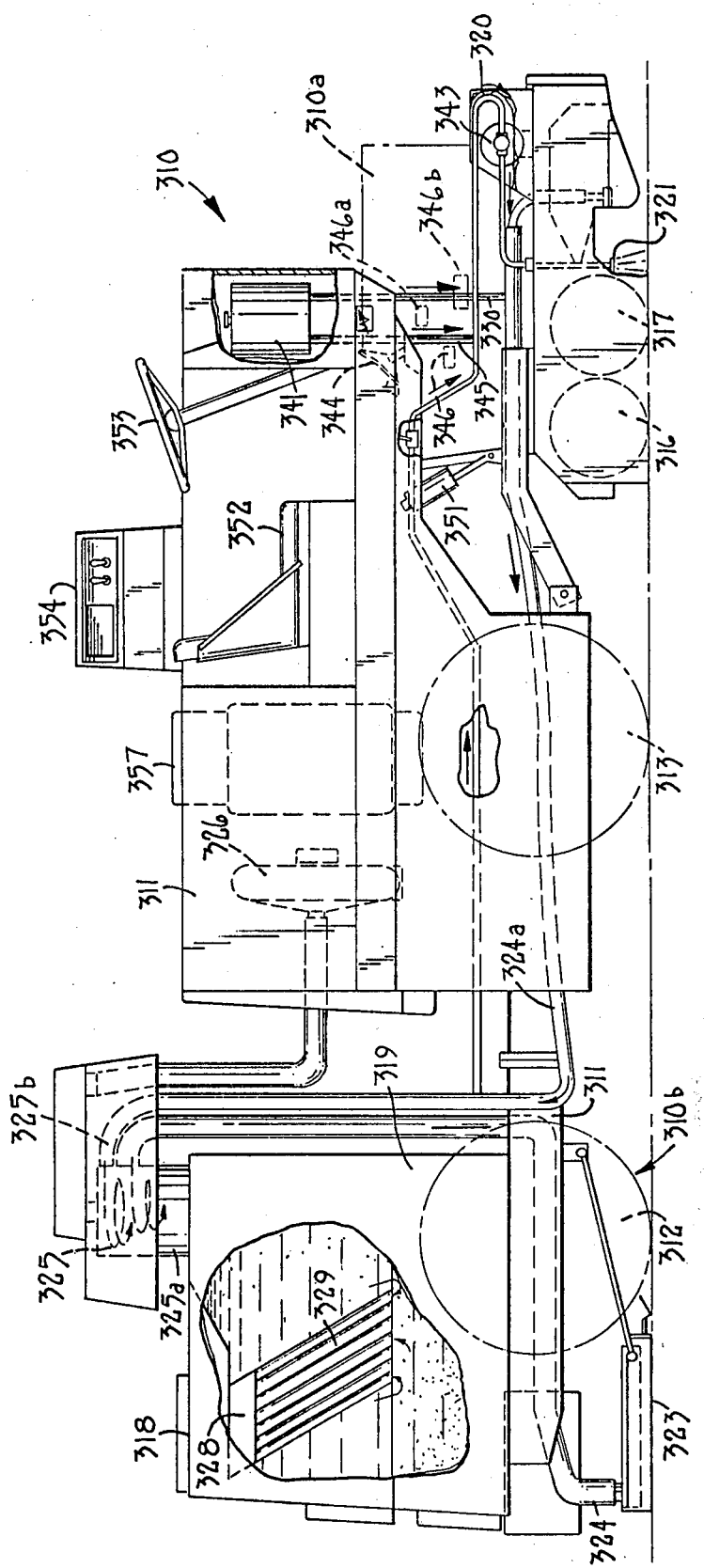
FIG. IX

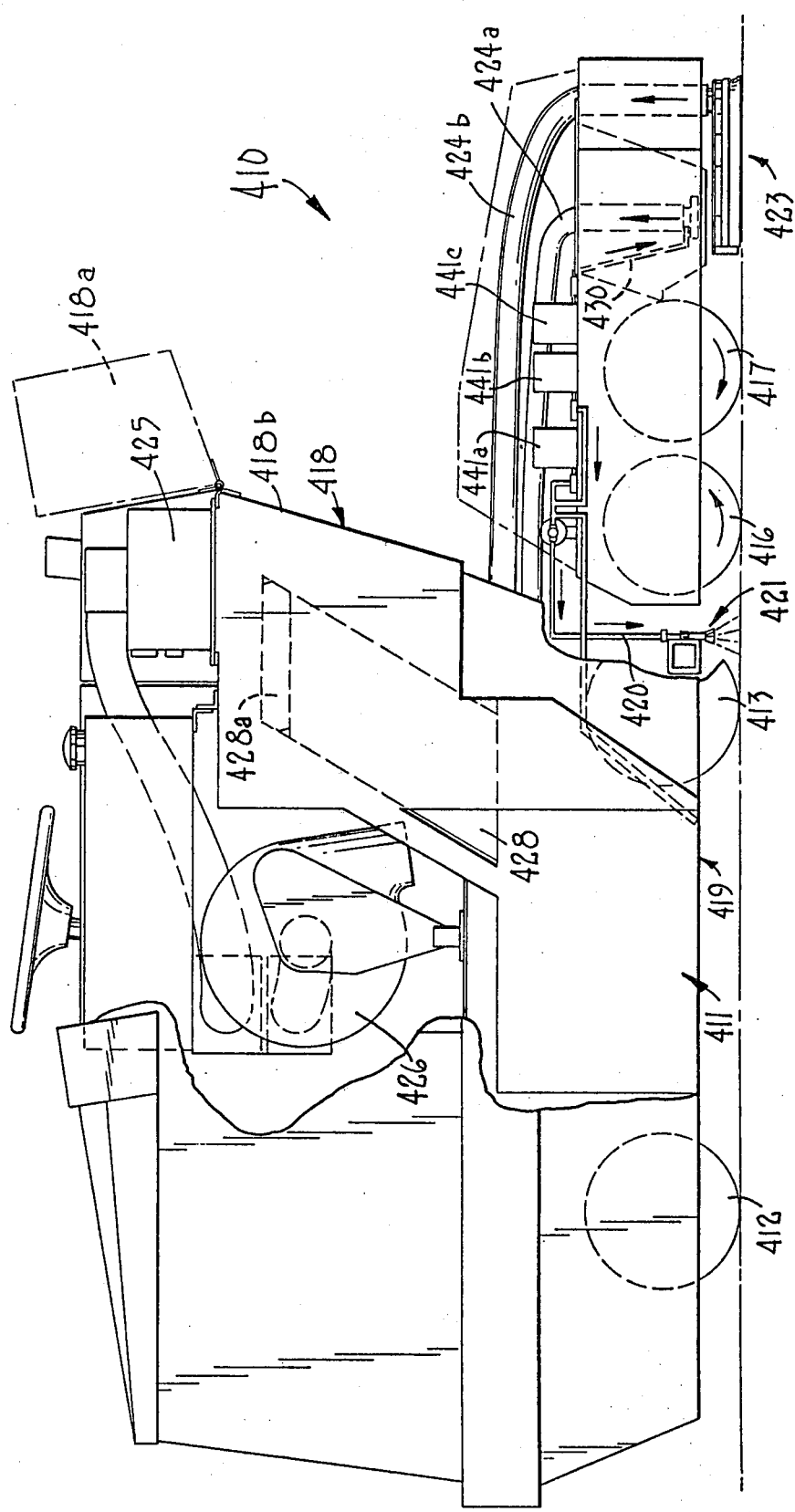
FIG. X

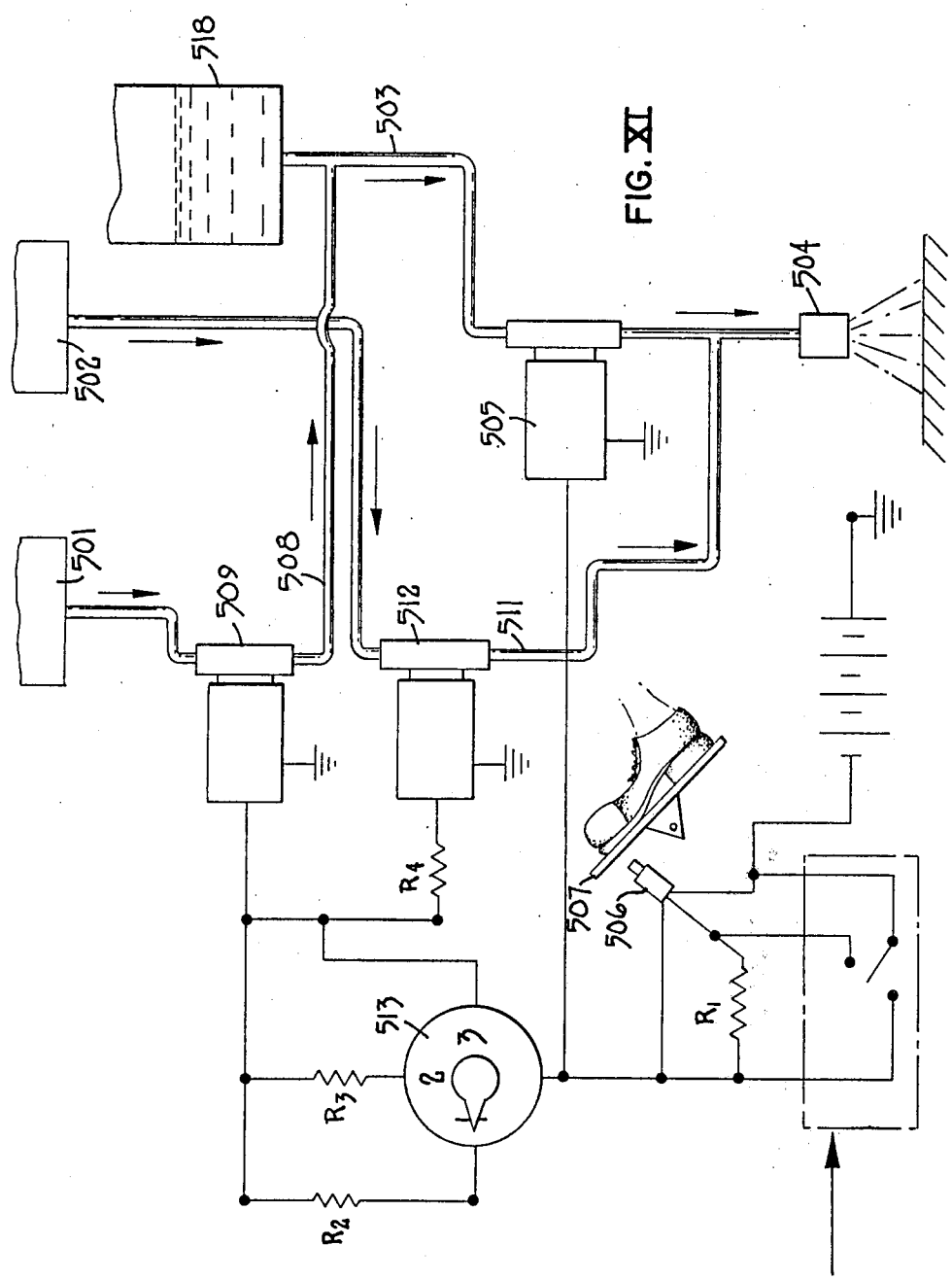
FIG. XI

SCRUBBING MACHINE WITH WATER REGENERATION

This is a division, of application Ser. No. 916,929, filed June 19, 1978, now U.S. Pat. No. 4,199,263, issued March 25, 1980.

BACKGROUND OF THE INVENTION

The present invention relates to a scrubber and more particularly to a scrubber which is designed for reuse of the cleaning solutions.

In the past, scrubbers have generally been of a type which utilizes the scrubbing solution only once. The solution then is discarded. Typically, such scrubbers have included spray nozzles for applying an aqueous detergent solution to the floor, a rotary scrubbing brush or brushes and a squeegee for picking up the used solution from the floor, generally by vacuum suction. In the past, such scrubbers have included two tanks. One tank has contained the fresh, unused solution and communicates with the nozzle section which applies the solution to the floor. The second tank has been used to contain and store the used scrubbing solution which has been picked up by a vacuum squeegee.

Although such scrubbers have done a satisfactory cleaning function, certain inherent problems have been present. For example, the amount of scrubbing solution carried by the scrubber has been limited, and thus the scrubber may be used only for a relatively short time, for example, twenty minutes. The scrubber then must be taken out of use, refilled with fresh scrubbing solution and emptied of used scrubbing solution. If one sought to overcome this problem by enlarging the tanks, the result was an over-sized scrubber which necessitated increased power and increased refilling times. In such past scrubbers, the down time required in filling the clean water tank and emptying the used water tank has generally been a major portion of cleaning activity. It is not at all unusual to find a loss of twenty minutes for emptying and refilling the tanks. In the past, the detergent solution was used only once and thus much of the detergent was wasted. Recirculating scrubbers have been known in the past; however, such scrubbers have generally merely recirculated dirty scrubbing solution. Such recirculating scrubbers have not been very effective.

An improved method for cleaning surfaces such as floors and pavements is disclosed in U.S. Pat. No. 3,753,777. A scrubbing machine applies a cleaning solution including a polyelectrolyte onto a surface to be cleaned. The solution is then agitated to remove soilage. The cleaning solution and flocs are then picked up by the scrubbing machine and the flocs settle thereby providing a regenerated cleaning solution for reapplication to the surface. The flocs are removed from the solution such as by filtration. A flocculating aid such as metallic salts may be used to enhance the degree of flocculation. The present invention is directed to a machine or apparatus which is highly suitable for carrying out scrubbing operations including the method of such patent.

The present invention overcomes the problems encountered in past scrubbers by separating the used cleaning solution into an essentially clean reusable portion and a sludge portion, preferably, utilizing laminar flow techniques. Thus, a majority of the cleaning solution may be reused substantially extending the operating time of the scrubber, substantially reducing wastage of cleaning agents and reducing non-productive cleaning time. The present scrubber provides for metering of cleaning agents and includes a section for reducing foaming in the recovery chambers.

DESCRIPTION OF THE INVENTION

The scrubber of the present invention may include a frame which is supported on a plurality of wheels for powered movement along a floor surface. The scrubber may be powered by an electric motor, gasoline engine or the like. The scrubber may include a steering mechanism which may be suitably connected to one or more of the wheels for controlling the direction traversed by the scrubber.

The frame supports a two chambered tank or pair of tanks, one chamber or tank being provided for containing the scrubbing solution and the other chamber or tank serving as a holding tank for the used scrubbing solution. A separator communicates between the two tanks. The separator draws used scrubbing solution from the one tank, separates the solution into a sludge portion and a reusable portion. The regenerated solution is passed on to the scrubbing solution tank for reuse.

The present scrubber may carry a supply of concentrated cleaning agents which may be added as needed for purposes of maintaining the desired concentration of cleaning agent in the recirculated solution. The present scrubber may further include supplies of various other materials for metering into the system such as flocculating agents and flocculating aids. Such cleaning agents, flocculating agents and/or flocculating aids may be fed into this system on a continuous basis and controlled by hand adjustable valves or alternatively the scrubber may include sensing devices for monitoring the concentrations of such materials and automatically metering in the necessary amounts.

The present scrubber may be provided of various sizes and styles. For example, the scrubber may be a walk behind model or it may be provided as a riding unit. The scrubber may be suitable for towing or pushing by another unit. Various other modifications may be made within the broader scope of the present invention.

IN THE DRAWINGS

FIG. I is a top view of one embodiment of the present invention with portions broken away;

FIG. II is a side view of the scrubber shown in FIG. I with portions broken away to show internal structure;

FIG. III is taken along line III—III in FIG. II;

FIG. IIIa shows a laminar flow tube assembly with a preferred plenum chamber;

FIG. IIIb illustrates a laminar flow tube assembly having a perforated plate located between the tubes and the plenum chamber;

FIG. IIIc shows a laminar flow tube assembly having an open pore cellular sponge in the plenum chamber;

FIG. IV is a top view of another embodiment of the present invention;

FIG V is a side view of the embodiment of FIG. IV;

FIG. VI is a perspective view of one type of separator which may be used in the present invention;

FIG. VII is a horizontal cross-sectional view of the separator of FIG. VI;

FIG. VIII is a vertical sectional view taken along the line VIII—VIII in FIG. VII;

FIG. IX is a side view of another embodiment of the present invention;

FIG. X is a side view of a further embodiment of the present invention; and

FIG. XI is a schematic view of a metering system according to the present invention.

DETAILED DESCRIPTION OF THE PRESENT INVENTION

The scrubber 10 shown in FIGS. I and II is a walk behind model and includes a frame 11 which is supported by a plurality of wheels such as 12 and 13. The wheel 12 may be driven by any suitable power source such as an electric motor or a gasoline engine (not shown). Certain features of the vehicle structure such as the engine, drive trains, and the like may be of a conventional type and therefore will not be detailed herein but will merely be referred to as being present. The wheel 13 may be pivotal to provide for steering of the scrubber 10. The scrubber 10 may include a bar 14 which is held by the operator for steering purposes as the operator walks along behind the machine during operation.

The scrubber 10 carries a pair of driven rotary scrubbing brushes 16 and 17 at the forward portion thereof. The brushes 16 and 17 may be of a type conventionally used in scrubbing machines and are substantially disc-shaped. Alternatively, cylindrical brushes may be used. The brushes 16 and 17 may be driven through a drive train (not shown) by the same power source as wheel 12.

The scrubber 10 includes a pair of tanks 18 and 19, one such tank being disposed along each side of the scrubber 10. The tanks 18 and 19 may be of any suitable size and shape. In FIGS. I and II, such tanks are shown as including an elongated horizontal portion such as 18a, 19a and an upwardly extending portion such as 18b, 19b. The tanks 18 and 19 may be constructed, for example, of plastic or metal sheet stock. The tank 18 is provided for containing the cleaning solution which typically is an aqueous detergent solution including a flocculating agent and may further include a flocculating aid. The detergent may be an anionic, a cationic, an amphoteric or a nonionic detergent. The flocculating agent may be a polyelectrolyte and the flocculating aid may be a metallic salt such as ferric chloride. The preferred cleaning solution is shown in U.S. Pat. No. 4,014,808 or in commonly assigned U.S. patent application Ser. No. 507,738, filed Sept. 20, 1974. The tank 19 is provided for containing the dirty or used cleaning solution as well as sludge material (i.e., precipitated soilage).

The scrubber 10 has an applicator 21 near the forward end of the scrubber 10 for applying scrubbing solution to the floor. The applicator 21 may be suitably connected to the tank 18 such as by pump and piping 45. The applicator 21 may be of a conventional type and may include a plurality of small spray nozzles adapted to deposit an appropriate amount of cleaning solution on the floor.

Scrubber 10 has a pick up section 22 which may include a squeegee 23 and a vacuum line 24 which is connected to a suitable vacuum source. For example, the upper portions 18b and 19b may be placed under a vacuum such as by pump 26. In other words, the cleaning solutions may fill the horizontal portions 18a and 19a of the tanks and the upper portions 18b and 19b may serve as vacuum tanks. Tube 27 may extend between the upper tank portions 18b and 19b thus providing for equalization of the vacuum or negative pressures in such tanks. The vacuum in tank portions 18b and 19b may be adequate to draw the used solution from squeegee 23 up through pipe 24 and into tank 19. Typically, the pressure in tank portion 19b may be approximately 50 inches of water less than ambient pressure.

The scrubber 10 has a separating section 28 which may be any apparatus suitable for separating suspended soilage from the scrubbing solution. The separating section 28, may, for example, be a plurality of laminar flow tubes 29. A description of the function and structure of laminar flow tubes is set forth in a publication entitled "Chevron Tube Settler", Technical Bulletin Vol: 9, No. 2, dated February, 1971, which is published by Permutit Sybron Corporation of Paramus, N.J.

Laminar flow tubes have previously been used in quiescent holding tanks and have not been used in mobile units such as scrubbers. Certain difficulties are encountered when adapting laminar flow tubes separators for use in mobile scrubbers. Movement of the scrubber (i.e. engine vibration, accelerating, deaccelerating and going around corners) may produce sloshing and short circuiting. In the present invention, these difficulties of sloshing and uneven flow through the tubes have been overcome by provision of a water filled plenum chamber immediately above the tubes. The laminar flow tubes 29 may be disposed at a slope less than vertical (e.g. 10° to 45° preferably 30° from vertical). The laminar flow tubes may be constructed of a plurality of tubes having circular, square or arcuate cross section. One preferred type of tube is shown in FIG. III. The tubes 29 may be contained within a jacket 33 such as of sheet metal. The separator 28 is open at the lower side 34 for reception of dirty cleaning solution. A tube or pipe 36 extends from the upper portion of separator 28 into the upper portion 18b of tank 18 for carrying regenerated solution.

Alternative laminar flow tube assemblies are illustrated in FIGS. IIIa through IIIc. The laminar flow tube assembly 28a of FIG. IIIa includes jacket 33a with a plenum, and a plurality of laminar flow tubes supported in the lower portion of the jacket. The jacket is open at the bottom 34a for reception of dirty scrubbing solution. The plenum 35a in this instance is tapered, increasing in size from left to right. This vertical dimension may be just adequate at any given point to carry the flow of reusable scrubbing solution from the preceding laminar flow tubes. The plenum is maintained full of solution at all times during operation. The opening in outlet pipe 36a is sufficiently restrictive to result in a back pressure. This arrangement assures that there is a uniform back pressure to each of the tubes 29a thus minimizing short circuiting and non-uniform flow through the tubes 29a and minimizing floc carryover.

The laminar flow tube assembly 28b of FIG. IIIb is similar to assembly 28a and includes a jacket 33b, a plenum 35b and a plurality of laminar flow tubes 29b. Assembly 28b has a perforated plate 37b located in the plenum 35b immediately above the tubes 29b. The openings in plate 37b permit restricted flow of scrubbing solution therethrough resulting in back pressure which facilitates uniform flow through the tubes 29b.

Laminar flow tube assembly 28c is also of similar construction having a jacket 33c, a plenum 35c, and a plurality of laminar flow tubes 29c. Assembly 28b has an open celled sponge 37c located in the plenum 35c to provide back pressure and thus uniform flow through the tubes 29c.

The scrubber 10 may include a system for metering chemicals into the cleaning solution as required. The scrubber 10, for example, may have a tank 41 which holds concentrated detergent for controlled addition to the cleaning solution after leaving tank 18. Tank 42 holds the flocculating agent such as a polyelectrolyte which may be added to the cleaning solution after leaving tank 18. Tank 43 may serve to hold the flocculating aid such as ferric chloride or clay until added to the cleaning solution. The flocculating aid may be added to the cleaning solution while the latter is on the floor or immediately after the cleaning solution is picked up from the floor. The materials in tanks 41, 42 and 43 may be metered into the cleaning solution such as by metering pumps 46 and 47. A pump 50 may be provided to move the scrubbing solution to the application section 21. Pump 50 may serve as a metering device.

OPERATION OF THE INVENTION

Although the operation of scrubber 10 is apparent from the preceeding description, it will be further described hereinafter. Scrubber 10 is readied for operation by filling tank portions 18a and 19a with water or cleaning solution such as an aqueous solution of anionic, cationic, amphoteric, or nonionic detergent solution. The cleaning solution may be of the type shown in U.S. Pat. No. 4,041,808. The chemical system may be as shown in the copending application, U.S. patent application Ser. No. 507,738 filed Sept. 20, 1974, and that disclosure is incorporated herein by reference. The power source is then actuated and the operator grasps the bar 14 to direct the scrubber 10 along the scrubbing path. The operator actuates the cleaning solution feed controls (not shown) and solution moves from tank 18 through suitable piping 45 to the application section 21, thus providing a layer of cleaning solution on the floor. The brushes 16 and 17 are rotatably driven and, as they engage the cleaning solution, scrubbing takes place. The cleaning solution remains on the floor until it is contacted by the pick up section 22. In other words, squeegee 23 collects the detergent solution and suspended soilage particles which in turn are drawn up through piping 24 and deposited into tank 19. Simultaneously with withdrawal of cleaning solution from tank 18, cleaning solution is drawn through separator 28 then through conduit 36 thus maintaining a level of solution in tank 18 substantially constant.

Dirty solution deposited in tank 19 is gradually drawn into separator 28 which separates out the suspended soilage dropping it into the bottom portion of tank 19. The cleaned solution is in turn drawn through conduit 36 and deposited into tank 18. Referring to FIG. III, the separation takes place due to laminar flow patterns set up in the tubes 29. The suspended matter has a tendency to settle out and in fact moves downwardly by gravity pull on the lower side of tubes 29 while the cleaned solution move upwardly through the tubes.

Laminar flow tubes are well known as separating devices and their operation is well documented. Therefore, detailed description of such operation is not set forth herein except to state that the laminar flow tubes may be used in the present invention to separate the dirt particles from the cleaning solution. The clarified scrubbing solution is pushed up into the tubes and is drawn out the top of the tubes. The material which settles out forms a sludge which falls out the bottom of the tubes to collect in the bottom of tank 19. Recirculation of regenerated solution takes place with cleaning solution moving from tank 18 to applicator 21, thence to pick up section 22. The solution is next returned to tank 19 and separation of suspended material takes place. Cleaned solution finally is returned to tank 18. Recirculation may continue and the solution may be reused until the lower portion of tank 19 is substantially filled with sludge.

Concentrated detergent from tank 41 may be metered into the recirculating cleaning solution to make up for depleted detergent. Flocculating agent from tank 42 may be added in an appropriate amount to maintain the desired flocculation. If desired, a flocculating aid from tank 43 may be added to the dirty cleaning solution following pick up by the squeegee but preferably prior to return of such solution to tank 19. The metering may be automated or alternatively may be manually controlled.

Once the maximum amount of sludge has accumulated in tank 19 and before sludge begins to be drawn up into separator 28, the operator stops the scrubber 10 and empties tank 19 including the sludge collected in the bottom thereof. Subsequently, the tank 19 is again filled with cleaning solution and scrubbing is continued.

ALTERNATE EMBODIMENTS OF THE INVENTION

An alternate embodiment 110 of the present invention is illustrated in FIGS. IV and V. Scrubber 110 may be similar to scrubber 10 in construction and operation; however, scrubber 110 has a different separating section. The scrubber 110 uses a filtration arrangement rather than laminar flow tubes. Scrubber 110 has a single cleaning solution tank 118 with a mesh basket 119 supported therein. The basket 119 may have a plurality of rod members such as 119a which are engaged with bracket members 118a on the walls of tank 118. The basket 119 may be suspended or spaced from the bottom of tank 118. A box-like filter 129 may be disposed in basket 119. The filter 129 is of a porosity suitable for removing the soilage, for example, in the form of flocs, from the cleaning solution. The scrubber 110 may operate using the vacuum principle described with regard to scrubber 10 with return pipe 124 feeding dirty solution into the filter basket 119. The solution subsequently moves through the filter 129 leaving the sludge in the basket 119. The clean solution may then be recirculated such as through pipe 146 and suitable pumps. Concentrated chemicals may be added to the solution using a metering system as described with regard to scrubber 10. The sludge may be removed from the scrubber 110 by lifting basket 119 out of tank 118 and dumping the filter 129. A new filter is then placed in basket 119, which in turn is placed again into tank 118. This filtration system works most effectively when used with the method described in U.S. Pat. No. 3,753,777.

A further separating unit 217 is shown in FIGS. VI through VIII. Separating unit 217 may be used in conjunction with a scrubber such as the one shown in FIGS. I and II. The separating unit 217 includes a tank 218 which is divided internally by wall structure 220 into a plurality of chambers 221 through 232 (FIG. VII). Each of the chambers 221-232 has an opening 221a-231a which communicates with an adjacent chamber. Each of sequential opening 221a-231a is disposed slightly lower in elevation than the preceding opening as shown in FIGS. VI and VIII. This results in the solution being drawn from the top of the preceding chamber. The dirty solution from return pipe 234 enters chamber 221 moves through opening 221a into chamber 222. The solution moves from chamber 222 through opening 222a into chamber 223. In like manner, the solution moves sequentially through the remaining chambers 224–232. Flocculation and settling takes place in each of the chambers with the cleaning solution gradually losing the soilage thereby becoming reusable. The unit 219 may be suspended within the filter 129 and basket 119 of FIG. IV to provide combined benefits. The separating unit 228 may further include a tank 218 which holds regenerated solution until reused in the scrubbing.

An alternate embodiment 310 of the present invention is illustrated in FIG. IX and includes a frame 311 supported on a plurality of wheels 312 and 313. Wheels 312 may be suitably driven such as by a propane powered engine. The scrubber 310 has a pair of cylindrically shaped scrubbing brushes 316 and 317 which are suitably driven. Scrubber 310 has a tank with a pair of chambers 318 and 319 for handling of scrubbing solution. The chambers 318 and 319 communicate through a separator 328 which may be a plurality of laminar flow tubes 329 substantially as described with regard to scrubber 10. The tanks 318 and 319 are under a partial vacuum such as 50 inches of water less than atmospheric pressure. The clean solution tank 318 is connected to an applicator or spray section 321 such as by tubing 320. A tank 341 contains concentrated cleaning agent which is appropriately fed into the tubing 320 through line 345, thereby providing for adjustment of the cleaning solution during operation. Line 345 may have a pump, 346 which serves as a metering valve and which controls the rate at which the cleaning agent is added to the cleaning solution. The pump 346 may be electronically actuated. The clean solution feed line 320 may include a pump 343 which serves as a metering valve which is connected to a foot control 344. The foot control 344, which may also serve as the throttle for the power source, is used by the operator to adjust and meter the flow rate of cleaning solution to the surface being scrubbed.

The scrubber 310 includes a vacuum pick up squeegee 323 in the rear portion of the scrubber. The pick up squeegee 323 is connected by a tube 324 to a scroll unit 325. The scroll unit 325 serves to separate entrained air from the scrub water. The scroll unit also serves to eliminate mist and reduce the amount of foam present in the wash water prior to depositing the wash water in the dirty water tank 319. The scroll unit 325 may be operated by a vacuum pump 326. A flocculating aid may be added through line 324a to the wash water coming into the scroll unit 325 such as through tubing 330 extending from a tank in the forward part of the scrubber 310. The scroll unit also serves to increase floc growth and enhance floc settling and to provide a gentle entrance into the settling tank. The scroll unit permits use of a smaller plenum area and allows more complete filling of the tanks. The scroll unit 325 may be of any suitable cyclonic structure which will provide a suitable separation of the air and wash solution. For example, the scroll unit 325 may be a cylindrical or frustoconical wall structure 325a with a tangential inlet duct 325b. The incoming wash solution is thus pneumatically propelled in a cyclonic path. The scroll unit is under the same partial vacuum as tanks 318 and 319.

The forward portion 310a of the scrubber 310, including brushes 316 and 317 as well as spray nozzles 321, may be pivotally supported with regard to the main portion 310b of the scrubber such that the brushes 316 and 317 may be raised for example, hydraulically when not scrubbing. For example, the unit 310a may be raised by hydraulic cylinder 351.

The scrubber 310 is of a riding type and includes a seat 352 for the operator and a steering wheel 353 which is connected by suitable linkage, for example, to wheels 313. The scrubber 310 has a control panel 354 including controls for adjusting the metering valves such as 346, 346a, 346b. The scrubber 310 may be powered by an engine operating on propane gas such as from tank 357. Alternatively, the scrubber may be powered by a diesel or gasoline engine. If desired, the scrubber may be battery driven.

A further embodiment, scrubber 410, is illustrated in FIG. X. The scrubber 410 generally may be of conventional construction, however, it is adapted to renew and recirculate the scrubbing solution in accordance with the present invention. Scrubber 410 includes a suitable body or frame 411 and a plurality of wheels such as 412 and 413. The scrubber 410 is suitably powered such as by a gasoline engine. The scrubber 410 has a lower dirty solution chamber 419 and an upper clean solution chamber 418 which are interconnected by a suitably separator 428. The tank 418 has a cover 428a which is hinged to a lower portion 418b to provide access to th tank 418 and the separator 428.

The separator 428 may be made up of a plurality of laminar flow tubes as described with regard to scrubber 10. The separator 428 may include an open celled sponge structure 428a which lies over the top of the laminar flow tubes and serves to reduce sloshing and short circuiting of the laminar flow tubes.

The scrubber 410 has an applicator 421 which may be made up of plurality of spray nozzles. The applicator 421 is connected to the clean solution tank 418 by piping 420 The scrubber 410 has a plurality of small tanks 441a, 441b and 441c. Small tank 441a may contain cleaning agent for addition to the recirculating scrubbing solution. A metering valve may be provided for controlling the amount of cleaning agent added to the solution. Tank 441b may be provided for supplying a flocculating agent such as the polyelectrolyte described in U.S. patent application No. 507,378. The flocculating agent may be added to the scrubbing solution prior to applying the scrubbing solution to the floor and thus may feed directly into the pipe 420. The tank 441c may be provided for supplying a flocculating aid. The flocculating aid may be fed into pipe 424b or as shown in FIG. X, it may feed into the pick up section 423 through pipe 430.

The scrubber 410 has a pair of cylindrically shaped counter rotating scrubbing brushes 416 and 417 which serve to assist the scrubbing solution in removing soilage from the surface being scrubbed. The brushes 416 and 417 may be driven by the same power unit as the wheels 413. The pick up section 423 may include a vacuum powered squeegee and a pair of vacuum pipes 424a and 424b which lead to a scroll unit 425. The scroll unit 425 serves to reduce foam and provide longer reaction time, as well as, to remove heavy matter from the scrubbing solution prior to depositing such solution in the lower tank 419. The scrubber 410 has a vacuum pump 426 which operates through the cyclone 425 to provide a vacuum or draw on the pick up section 423.

When in operation, scrubbing solution from tank 418 is pumped along pipe 420 and an appropriate amount of concentrated cleaning agent is added to adjust the concentration in the scrubbing solution to the desired level.

The concentration of flocculating agent in the scrubbing solution is likewise adjusted such as by adding a polyelectrolyte from tank 441b to such solution. The brushes 416 and 417 scrub the wetted floor surface to remove any difficult soilage. The scrubbing solution and suspended materials are picked up by section 423 and are conveyed to the tangential entrance of scroll 425 such as through the pipes 424a and 424b. A liquid and air mixture enters the scroll 425 and the liquid together with heavy matter such as stones, metal chips and the like move radially outwardly. The gaseous portion, i.e. air, moves radially inwardly and is withdrawn at the center, with a minimum of liquid, by the vacuum fan. Further, it has been found that the scroll unit provides smooth entry of the solution into the tank 419 thus avoiding break up of flocs.

The dirty scrubbing solution is then conveyed into a tank 419 where it is stored until it is moved through separator 428. The separator 428 divides the scrubbing solution into a sludge portion which is returned to tank 419 and a clean portion which is moved on to tank 418. The sponge-like structure 428a lies immediately above the laminar flow tubes of separator 428 and serves to provide a uniformity of flow through the various laminar flow tubes. A plate having a plurality of small openings will serve the same purpose as the sponge-like member 428a. The cleaned solution in tank 418 is then again pumped to piping 420 and recycling continues.

A suitable metering system may be used with the various scrubbers such as scrubbers 10, 310, 410. The metering system may provide for control of the amount of cleaning solution applied to the scrub area. The metering system may also serve to control the addition of chemicals to the recirculating cleaning solution.

A suitable cleaning solution control system is shown schematically in FIG. XI in conjunction with a cleaning agent supply tank 501 and a flocculating agent supply tank 502. A cleaning solution supply line 503 extends from tank 518 to nozzles 504. The supply line 503 has an electrically powered pump 505 for moving cleaning solution from tank 518 to nozzles 504. A two-way pump switch 506 is associated with the accelerator peddle 507. When peddle 507 is only partially depressed, the pump switch is biased in the position of low pump speed and the pump, for example, may operate at a rate of 3 gallons of cleaning solution per minute. If the accelerator is depressed, the peddle 507 contacts switch 506 overcoming the resistor (R) and shifting the switch to the high speed position where pump 505 operates, for example, at a rate of 6 gallons per minute. The cleaning agent supply tank 501 is connected by supply line 508 to cleaning solution line 503. The cleaning agent supply line 508 includes an electrically powered metering pump 509.

The flocculating agent supply tank 502 is connected to cleaning solution line 503 by line 511 which includes a metering pump 512.

The metering pumps 509 and 512 are controlled by a three position switch 513. The operator can select a flow rate depending on the soilage present on the floor. The switch 513 operates the pumps 509 and 512 at a low, medium or high flow rate. The switch 513 is connected in series with switch 506 so that the rate of chemical flowing through pumps 509 and 512 are coordinated with the flow rate of cleaning solution through pumps 505. The metering system may be modified as desired. For example, the switch 506 may be replaced with a variable rheostat so that the rate of flow through pump 505 is infinitely variable depending on the speed of the vehicle. Various other modifications may be made to the metering system.

It is to be recognized that various modifications may be made in the present scrubber without departing from the broader scope of the present invention. For example, various other separating devices may be used to clarify the scrubbing solution, for example, a centrifuge, strainer, filter bag or the like.

What is claimed:

1. A scrubbing device including a body portion suitable for movement along a surface to be scrubbed; a tank chamber for storing clean scrubbing solution;
   applicator means for applying scrubbing solution from said tank chamber to a surface to be scrubbed, said applicator means including means for controlling the amount of scrubbing solution applied to said surface;
   means for lifting dirty scrubbing solution from said surface;
   separator means for receiving dirty scrubbing solution from said lifting means for separating said dirty scrubbing solution into a clean solution portion and a solid matter portion, said separator means comprising a series of interconnected settling chambers through which the scrubbing solution may sequentially travel, said settling chambers being defined by wall means, said wall means defining openings adjacent the surface of the upper portion of the solution contained in each chamber through which solution may flow;
   whereby the solution is drawn into each chamber from the portion adjacent the upper surface of solution in the proceeding chamber;
   and means for conveying said clean solution portion from the final settling chamber of said series into said tank chamber.

2. The scrubbing device of claim 1 wherein said device includes means for agitating said solution on said surface.

3. The scrubbing device of claim 2 wherein said agitating means comprise at least one brush.

4. A scrubbing device including a body portion suitable for movement along a surface to be scrubbed;
   a tank chamber for containing clean scrubbing solution;
   applicator means for applying scrubbing solution from said tank chamber to a surface to be scrubbed, said applicator means including means for controlling the amount of scrubbing solution applied to said surface and means for agitating said solution on said surface, said agitating means comprising at least one brush;
   means for lifting said scrubbing solution from said surface;
   separator means for receiving dirty scrubbing solution from said lifting means, said separator means being for separating said dirty scrubbing solution into a clean solution portion and a solid matter portion, said separator means having fluid communication with said lifting means, said separator means comprising a tank, said separator means being internally divided by wall means to provide a series of interconnected settling chambers through which the scrubbing solution may sequentially travel, said wall means defining a plurality of openings, one of said openings being disposed between each pair of adjacent settling chambers, each sequential opening being disposed slightly lower in elevation than the preceding opening whereby the solution is drawn into each chamber from the portion adjacent the upper surface of the solution in the preceding chamber; and means for conveying said clean solution portion from the final settling chamber of said series into said tank chamber.

5. A scrubbing machine adapted for recirculation of scrubbing solution, said machine comprising:

a chamber for holding scrubbing solution;

means for applying scrubbing solution from said holding chamber to the surface to be scrubbed and means for agitating said solution on said surface;

vacuum means for lifting said scrubbing solution for said surface;

means for separating the lifted solution into a reusable portion and a sludge portion, said separating means comprising a plurality of walls defining a plurality of settling chambers through which said lifted solution is sequentially passed, said walls defining openings providing fluid communication between each of said settling chambers, each sequential opening being disposed slightly lower in elevation than the preceding opening thereby drawing the solution from adjacent the surface of the upper portion of the solution in the preceding chamber; and means for conveying said reusable portion to said holding chamber.

* * * * *

UNITED STATES PATENT AND TRADEMARK OFFICE
CERTIFICATE OF CORRECTION

PATENT NO. : 4,377,017

DATED : March 22, 1983

INVENTOR(S) : Ferdinand J. Herpers et al.

It is certified that error appears in the above-identified patent and that said Letters Patent is hereby corrected as shown below:

Title Page, column 1, line 6, "4,199,263" should read -- 4,194,263 --.

Signed and Sealed this

Sixteenth Day of August 1983

[SEAL]

Attest:

GERALD J. MOSSINGHOFF

Attesting Officer     Commissioner of Patents and Trademarks